(12) United States Patent
Gimblet et al.

(10) Patent No.: US 11,809,010 B1
(45) Date of Patent: Nov. 7, 2023

(54) METHODS FOR PREPARING ROUND FIBER OPTIC CABLES AND FIBER OPTIC CABLE ASSEMBLIES FOR FLAT CABLE CONNECTOR TERMINATION

(71) Applicant: Corning Research & Development Corporation, Corning, NY (US)

(72) Inventors: Michael John Gimblet, Conover, NC (US); Kristen Shea Harmon, Lenoir, NC (US); Xin Liu, Conover, NC (US); Radawan Ripumaree, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 8 days.

(21) Appl. No.: 17/733,373

(22) Filed: Apr. 29, 2022

(51) Int. Cl.
   *G02B 6/44* (2006.01)
   *G02B 6/38* (2006.01)

(52) U.S. Cl.
   CPC ......... *G02B 6/4471* (2013.01); *G02B 6/3858* (2013.01); *G02B 6/448* (2013.01); *G02B 6/3887* (2013.01); *G02B 6/4479* (2013.01)

(58) Field of Classification Search
   None
   See application file for complete search history.

(56) References Cited

U.S. PATENT DOCUMENTS

| | | | |
|---|---|---|---|
| 5,287,426 A | 2/1994 | Shahid | |
| 5,469,521 A | 11/1995 | Coutts et al. | |
| 7,729,584 B2 | 6/2010 | Cody et al. | |
| 8,272,792 B2 * | 9/2012 | Coleman | G02B 6/3823 385/139 |
| 8,285,096 B2 | 10/2012 | Coleman et al. | |
| 8,303,193 B2 * | 11/2012 | Coleman | G02B 6/3888 385/80 |
| 9,594,225 B2 | 3/2017 | Isenhour et al. | |
| 11,249,273 B2 * | 2/2022 | Blazer | G02B 6/4482 |
| 2002/0096793 A1 | 7/2002 | Marelli et al. | |
| 2004/0141708 A1 | 7/2004 | Yokobiki et al. | |
| 2013/0012783 A1 | 1/2013 | Vayser et al. | |
| 2013/0016948 A1 | 1/2013 | Smith et al. | |

FOREIGN PATENT DOCUMENTS

JP 57-186717 A 11/1982

\* cited by examiner

*Primary Examiner* — Omar R Rojas
(74) *Attorney, Agent, or Firm* — Michael E. Carroll, Jr.

(57) ABSTRACT

In one embodiment, a method of preparing a round fiber optic cable includes applying a cable orientation guide to a portion of the fiber optic cable. The fiber optic cable includes a jacket, a first strength member, a second strength member, and an optical fiber. The strength members and the optical fiber are disposed within the jacket along a strength axis. Applying the cable orientation guide rotates the fiber optic cable such that the strength axis is positioned along a preferential axis. The method further includes forming a punched area in the jacket. The method also include removing a portion of the jacket forward of the punched area to provide a flat end face defined by the punched area for attaching the cable to a retention body of a fiber optic connector.

24 Claims, 14 Drawing Sheets

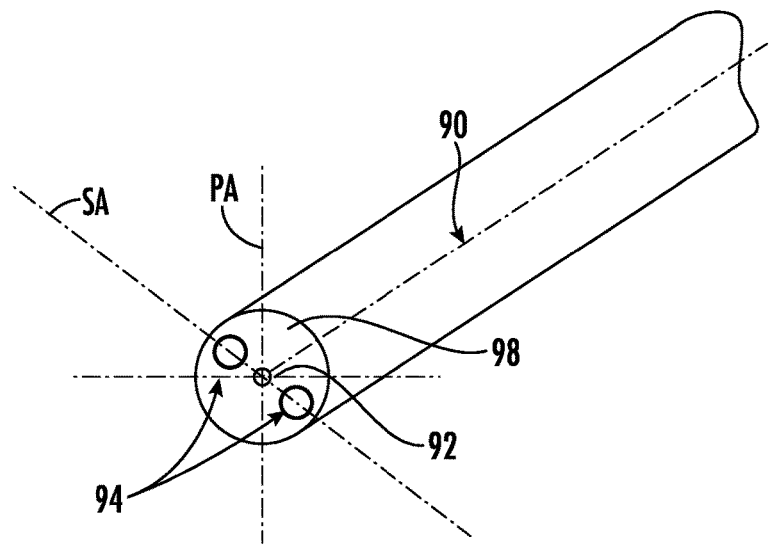
FIG. 2
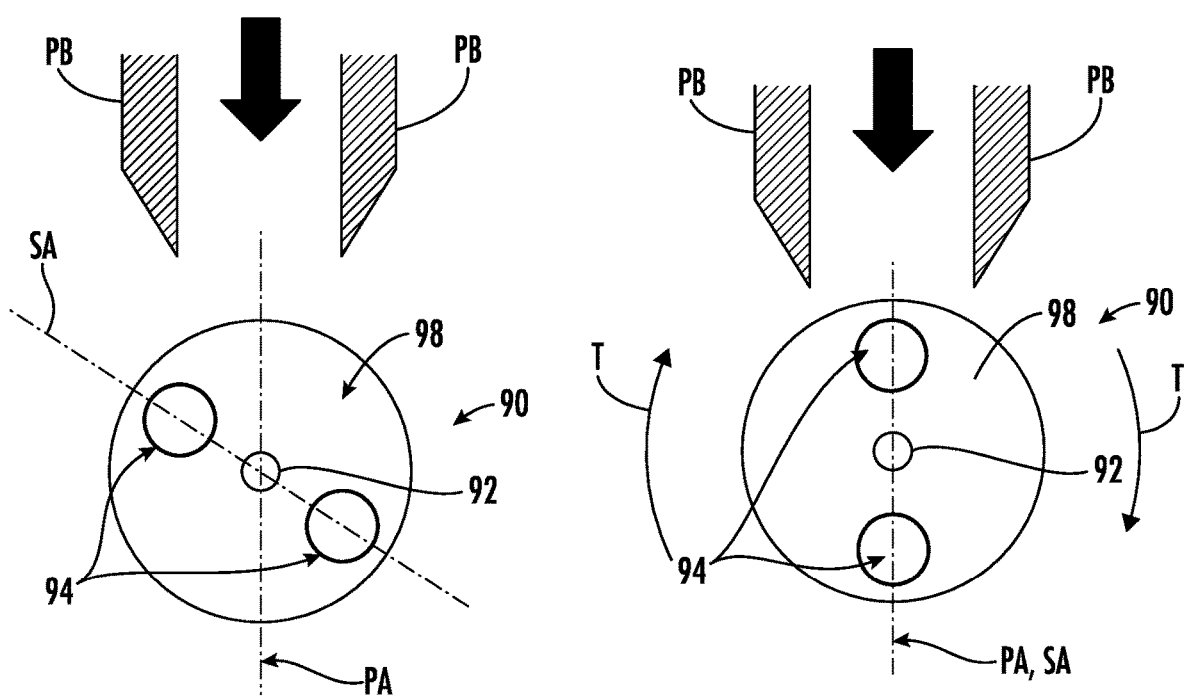
FIG. 3
FIG. 4

METHODS FOR PREPARING ROUND FIBER OPTIC CABLES AND FIBER OPTIC CABLE ASSEMBLIES FOR FLAT CABLE CONNECTOR TERMINATION

FIELD

The disclosure is directed to fiber optic cable preparation and, more particularly, to methods for preparing a round fiber optic cable for connectorization with a connector requiring a flat fiber optic cable.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G, and the like. As optical fiber extends deeper into communication networks there exists a need for building more complex and flexible fiber optic networks in a quick and easy manner.

There are many styles and configurations of optical connectors as well as fiber optic cables. For example, some fiber optic cables may come in a round form, and other fiber optic cables may come in a flat form wherein the fiber optic cables have two substantially parallel sides. Fiber optic connectors are configured to terminate either a round fiber optic cable or a flat fiber optic cable. However, it may be desirable to terminate a round fiber optic cable with a connector configured to terminate a flat fiber optic cable. The ability for a round fiber optic cable to be terminated with either a round-type optical connector or a flat-type optical connector may make the round fiber optic cable more flexible in that it can be terminated by more types of optical connectors. However, preparing a round fiber optic cable for termination by a flat-type optical connector risks damaging interior components of the round fiber optic cable, such as strength members and optical fibers.

Thus, alternative methods for preparing a round fiber optic cable for termination by a flat-type optical connector may be desired.

SUMMARY

In one embodiment, a method of preparing a round fiber optic cable includes applying a cable orientation guide to a portion of the fiber optic cable. The fiber optic cable includes a jacket, a first strength member, a second strength member, and an optical fiber. The first strength member, the second strength member and the optical fiber are disposed within the jacket along a strength axis. Clamping of the cable orientation guide curves the portion of the optical fiber, and rotates the fiber optic cable such that the strength axis is positioned along a preferential axis. The method further includes forming a punched area in the jacket by removing a first portion of the jacket that is offset from the strength axis in a first direction and removing a second portion of the jacket that is offset from the strength axis in a second direction. The method also include removing a portion of the jacket forward of the punched area to provide a flat end face defined by the punched area.

In another embodiment, a method of assembling an fiber optic cable assembly includes applying a cable orientation guide to a portion of the fiber optic cable. The fiber optic cable includes a jacket, a first strength member, a second strength member, and an optical fiber. The first strength member, the second strength member and the optical fiber are disposed within the jacket along a strength axis. Applying the cable orientation guide curves the portion of the optical fiber, and rotates the fiber optic cable such that the strength axis is positioned along a preferential axis. The method further includes forming a punched area in the jacket by removing a first portion of the jacket that is offset from the strength axis in a first direction and removing a second portion of the jacket that is offset from the strength axis in a second direction. The method also includes removing a portion of the jacket forward of the punched area to provide a flat end face defined by the punched area to expose a length of the first strength member, the second strength member, and the optical fiber, inserting the first strength member, the second strength member and the optical fiber into a retention body, and securing the first strength member and the second strength member to the retention body.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

BRIEF DESCRIPTION OF THE FIGURES

FIG. 2 illustrates a round fiber optic cable prior to forming a flat portion according to one or more embodiments described and illustrated herein;

FIG. 3 illustrates a round fiber optic cable in an undesirable rotational orientation that will cause damage to internal strength members by punching blades when preparing a flat portion according to one or more embodiments described and illustrated herein;

FIG. 4 illustrates a round fiber optic cable in a desirable rotational orientation such that a strength axis is aligned with a preferred axis and the punching blade will avoid contact with the strength members according to one or more embodiments described and illustrated herein;

DETAILED DESCRIPTION

References will now be made in detail to the embodiments of the disclosure, examples of which are illustrated in the accompanying drawings. Whenever possible, like reference numbers will be used to refer to like components or parts.

There are many styles and configurations of optical connectors as well as fiber optic cables. For example, some fiber optic cables may come in a round form, and other fiber optic cables may come in a flat form wherein the fiber optic cables have two substantially parallel sides. Fiber optic connectors are configured to terminate either a round fiber optic cable or a flat fiber optic cable. However, it may be desirable to terminate a round fiber optic cable with a connector configured to terminate a flat fiber optic cable. The ability for a round fiber optic cable to be terminated with either a round-type optical connector or a flat-type optical connector may make the round fiber optic cable more flexible in that it can be terminated by more types of optical connectors.

One option is to design dedicated connector part, such as a retention body, to accept a round cable for a connector that accepts a fiber optic cable with a flat profile. However, in order to fit the round fiber optic cable profile, a dedicated retention body has to be round and larger in size. To meet cable assembly side load performance requirements, more layers of heat shrink may be needed to pass testing requirements. The increased cable assembly outside diameter due to the dedicated retention body and multiple layers of heat shrink may exceed the port spacing of optical fiber terminals operable to receive the connectors.

Another option is to prepare a round fiber optic cable to have a flat portion that may be received by a connector that accepts a flat profile. This may be done by shaving, cutting, punching, sawing, grinding, and the like. However, preparing a round fiber optic cable for termination by a flat-type optical connector risks damaging interior components of the round fiber optic cable, such as strength members and optical fibers. The strength members are embedded inside the cable jacket. From the outside, an operator will not know exactly how to process the cable (how deep to cut into the cable jacket) without damaging the two strength members inside the of the fiber optic cable.

Various embodiments of methods for placing a round fiber optic cable in a known orientation so the strength members will not be damaged during a profiling process are described in detail below.

Figure 1A:
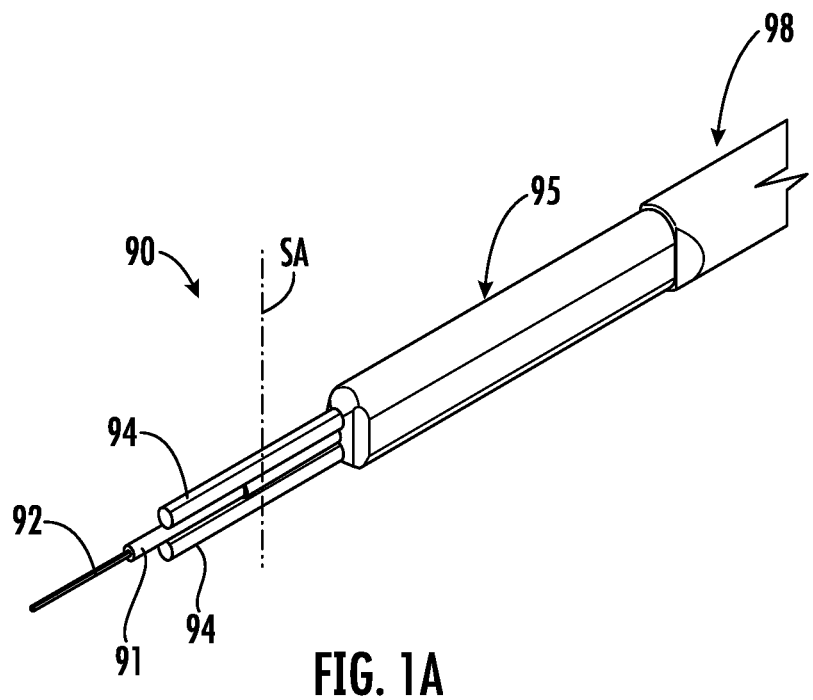
FIG. 1A illustrates an example prepared round fiber optic cable having a flat portion according to one or more embodiments described and illustrated herein.

Referring now to FIG. 1A, an example round fiber optic cable 90 having a flat portion 95 for receiving a retention body 59 (also referred to herein as a cable adapter) for connectorizing the fiber optic cable 90 with a connector that requires a flat fiber optic cable. The example fiber optic cable 90 comprises a round cable jacket 93, a flat portion 95 extending from the round portion, two strength members 94, and an optical fiber 92. The two strength members 94 and the optical fiber 92 are arranged in a radial line along a strength axis SA.

The strength members 94 provide strength to the fiber optic cable 90 and prevent the optical fiber 92 from breaking by bending forces applied to the fiber optic cable 90. The strength members 94 may be any component capable of providing strength to the fiber optic cable 90. Non-limiting examples of materials for the strength members 94 include metal wire, glass-reinforced plastic (GRP), and aramid yarns.

As shown in FIG. 1A, the optical fiber 92 may be coated with a coating layer 91 that is stripped away to expose the optical fiber 92 prior to connectorization.

Figure 1B:
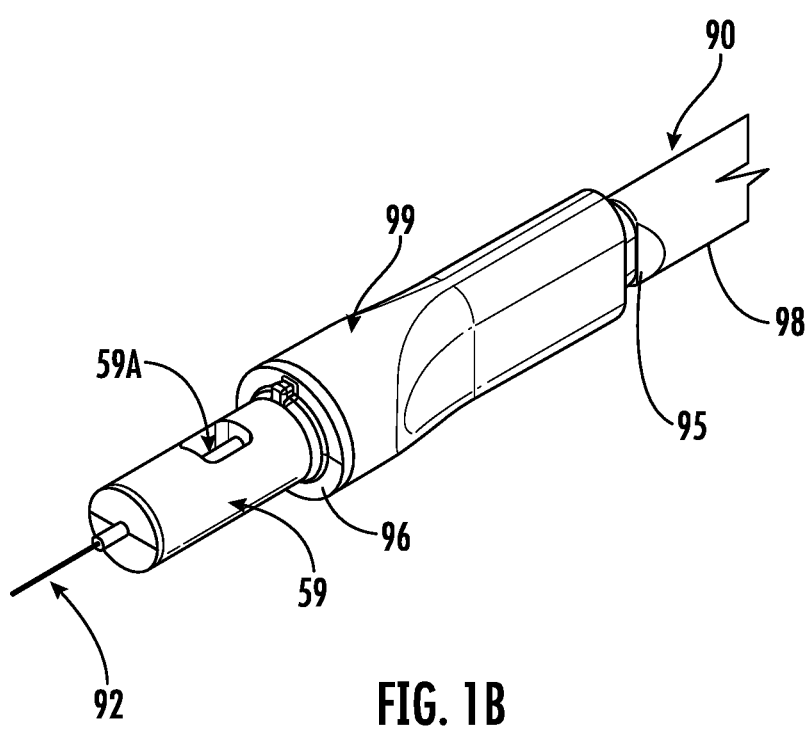
FIG. 1B illustrates a retention body and boot attached to the prepared round fiber optic cable of FIG. 1A according to one or more embodiments described and illustrated herein.

FIG. 1B illustrates the fiber optic cable 90 of FIG. 1A having a retention body 59 secured to the flat portion 95 of the fiber optic cable 90. The retention body 59 is rigidly secured directly to the fiber optic cable 90 and is configured to receive additional components of a fiber optic connector, such as a connector body. In some embodiments, a boot 96 may be provided over the flat portion 95 of the fiber optic cable 90 to provide a strain relieve function. The retention body 59 is coupled to the boot 96. In other embodiments, the boot 96 and the retention body 59 are one monolithic component. Heat shrink 99 may be applied over to boot 96 and/or the retention body 59 to provide sealing from the elements for the fiber optic cable 90 and connector components.

As shown in FIG. 1B, the retention body 59 includes an aperture 59A that provides access to an interior passageway within the retention body 59 and/or the boot 96. The optical fiber 92 and the two strength members 94 are disposed within the interior passageway. To secure the retention body 59 to the strength members 94 and thus the fiber optic cable 90, adhesive is disposed into the aperture 59A such that it fills the interior passageway. Upon curing, the adhesive rigidly secures the retention body 59 to the fiber optic cable 90 by bonding the strength members 94 to the retention body 59.

Referring now to FIG. 2, a perspective view of a fiber optic cable prior to forming a flat portion 95 for receiving a retention body is illustrated. The two strength members 94 and the optical fiber 92 are arranged within the jacket 98 in a radial line along a strength axis SA. A maximum bending force is required to bend the fiber optic cable 90 in a direction parallel to the strength axis SA due to the arrangement of the two strength members 94. On the other hand, a minimum bending force is required to bend the fiber optic cable 90 in a direction orthogonal to the strength axis SA. Thus, it is easier to bend the fiber optic cable 90 in a direction orthogonal to the strength axis SA than in a direction parallel to the strength axis SA.

To form the flat portion 95 illustrated in FIG. 1A, a punch cut is provided to remove two portions of the jacket 98 using punching blades. FIG. 3 illustrates a front view of a fiber optic cable 90 and two punching blades PB that may be components of a tool. When removing the two portions of the jacket 98, care should be taken to not cut or otherwise damage the two strength members 94 because doing so could compromise the strength of the connectorized fiber optic cable (i.e., the cable assembly). However, the position of the strength axis SA and thus the positions of the strength members 94 may be unknown due to the angular orientation of the fiber optic cable 90. When the fiber optic cable 90 is in the orientation illustrated by FIG. 3, the punching blades PB will pass through and damage the two strength members 94.

Thus, the angular position of the fiber optic cable 90 should be in a known position such that the strength axis SA is in a preferred axis PA. The preferred axis PA is the axis in which contact between the punching blades PB and the two strength members is avoided. The fiber optic cable 90 of FIG. 3 should be rotated to align the strength axis SA with the preferred axis PA. FIG. 4 illustrates the fiber optic cable 90 of FIG. 3 having been rotated as indicated by arrows T so that the strength axis SA is aligned with the preferred axis. As shown by FIG. 4, the punching blades PB of the tool may safely remove portions of the jacket 98. A first punching blade PB removes a first portion of the jacket 98 that is offset from the strength axis SA in a first direction and a second punching blade PB removes a second portion of the jacket 98 that is offset from the strength axis in a second direction.

Due to high-volume fabrication processes, it would be cost-prohibitive to visually inspect each fiber optic cable 90 to ensure they are in the proper orientation to avoid damage to the strength members 94.

Embodiments of the present disclosure provide for the angular rotation of the fiber optic cable 90 such that the strength axis SA is substantially aligned with the preferential axis PA and the fiber optic cable 90 is thus in a desired angular position.

Figure 5A:
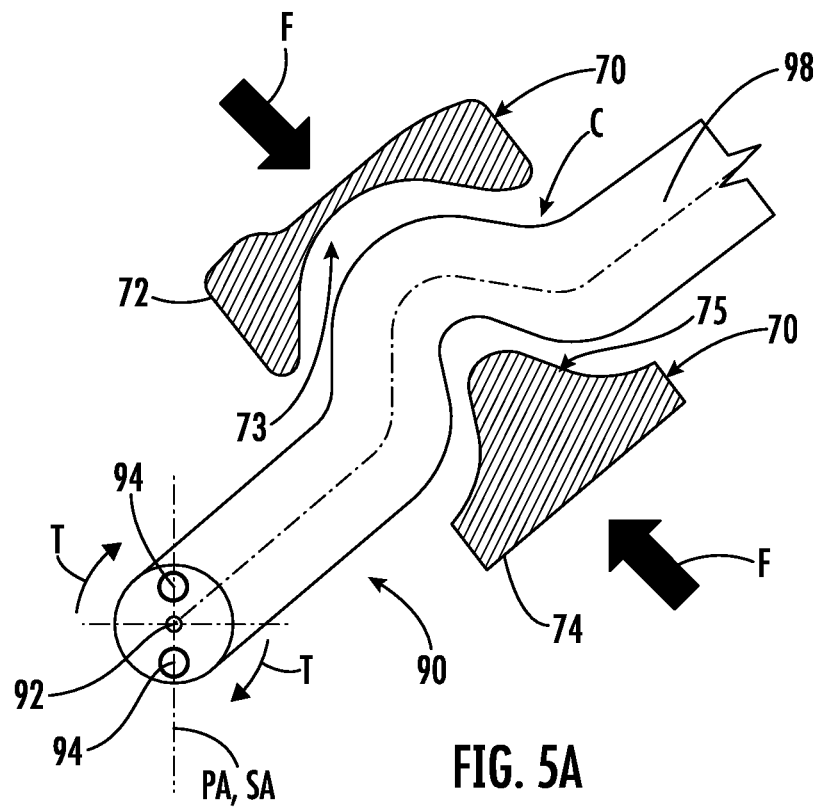
FIG. 5A illustrates a cable orientation guide that curves a round fiber optic cable to rotate it so that a strength axis is aligned with a preferred axis according to one or more embodiments described and illustrated herein.

Referring now to FIG. 5A, an example cable orientation guide 70 is clamped onto the jacket 98 of the fiber optic cable 90 to cause a curve C in the fiber optic cable 90 that in turn rotates the fiber optic cable 90 as indicated by arrows T so that the strength axis SA is aligned with the preferential axis PA. As stated above, the arrangement of two strength member 94 along the strength axis SA makes it more difficult for the fiber optic cable 90 to bend in a direction parallel with the strength axis SA. The preferential bending direction of the fiber optic cable 90 is in a direction that is orthogonal to the strength axis SA. Thus, when a force is applied to the fiber optic cable 90 to bend it, the fiber optic cable 90 preferentially rotates so that it bends in a direction that is orthogonal to the strength axis SA.

The cable orientation guide 70 imparts a curve C on the fiber optic cable 90. A coefficient of friction between the jacket 98 of the fiber optic cable 90 and the cable orientation guide 70 is low enough such that the fiber optic cable 90 is able to rotate within the cable orientation guide 70 as it is bent. The end of the fiber optic cable 90 rotates as shown by arrows T due to the cable wanting to be bent in a direction orthogonal to the strength axis SA. This rotation causes the angular position of the fiber optic cable 90 to be such that the strength axis SA is substantially aligned with the preferential axis PA. Following the application of the cable orientation guide 70, the fiber optic cable 90 may be ready to be cut by the punching blades PB as shown in FIG. 4.

The cable orientation guide 70 is a component that is configured to bend a fiber optic cable 90 while also allowing it to rotate so that the strength axis SA is substantially aligned with the preferential axis PA. In the illustrated embodiment, the cable orientation guide 70 comprises a first half 72 and a second half 74. The first half 72 has a concave surface 73 and the second half 74 has a corresponding convex surface 75. The first half 72 and the second half 74 of the cable orientation guide 70 are brought together such that the fiber optic cable 90 is disposed between the concave surface 73 and the convex surface 75. A clamping for F is applied on the cable orientation guide 70. The concave surface 73 and the convex surface 75 of the cable orientation guide 70 impart a bend on the fiber optic cable. A coefficient of friction between the jacket and the concave surface 73 and the convex surface 75 is low enough to enable the fiber optic cable 90 to rotate so that it bends in its preferred bending direction (i.e., a direction orthogonal to the strength axis SA).

Figure 5B:
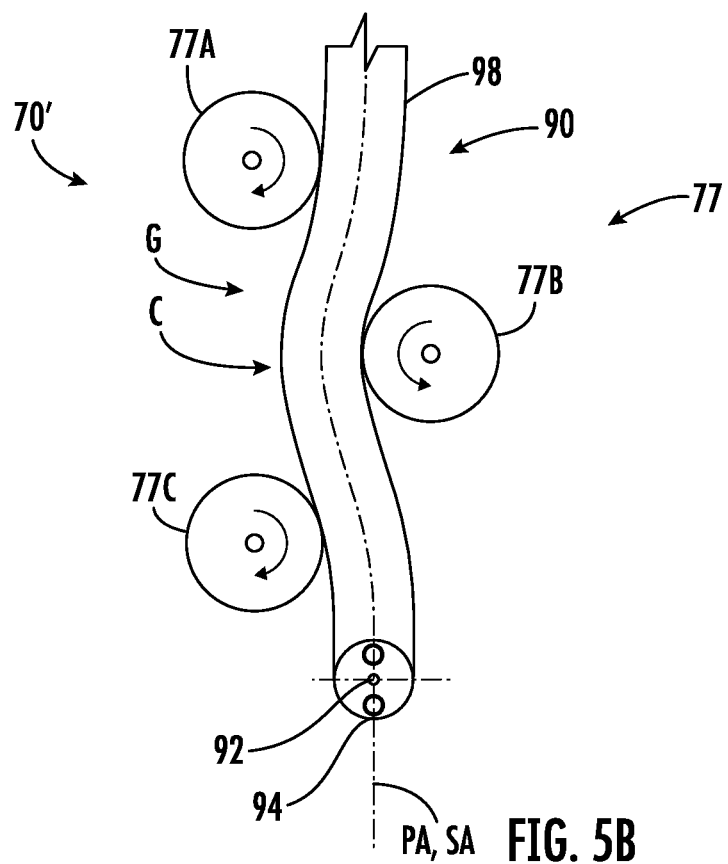
FIG. 5B illustrates a cable orientation guide configured as a set of rollers that curves a round fiber optic cable to rotate it so that a strength axis is aligned with a preferred axis according to one or more embodiments described and illustrated herein.

Referring now to FIG. 5B, another example cable orientation guide 70' is illustrated. The example cable orientation guide 70' comprises a set of rollers 77 that imparts one or more curves onto the fiber optic cable 90. In the illustrated embodiment, the set of rollers 77 includes a first roller 77A, a second roller 77B, and a third roller 77C. The first roller 77A and the third roller 77C are on one side of the fiber optic cable 90 and the second roller 77B is on a second side of the fiber optic cable 90. The second roller 77B pushes the fiber optic cable 90 into a gap G between the first roller 77A and the third roller 77C to form a curve in the fiber optic cable 90. As described above with respect to FIG. 5A, the bending of the fiber optic cable 90 causes the fiber optic cable 90 to rotate so its strength axis is substantially aligned with the preferential axis.

Figure 6:
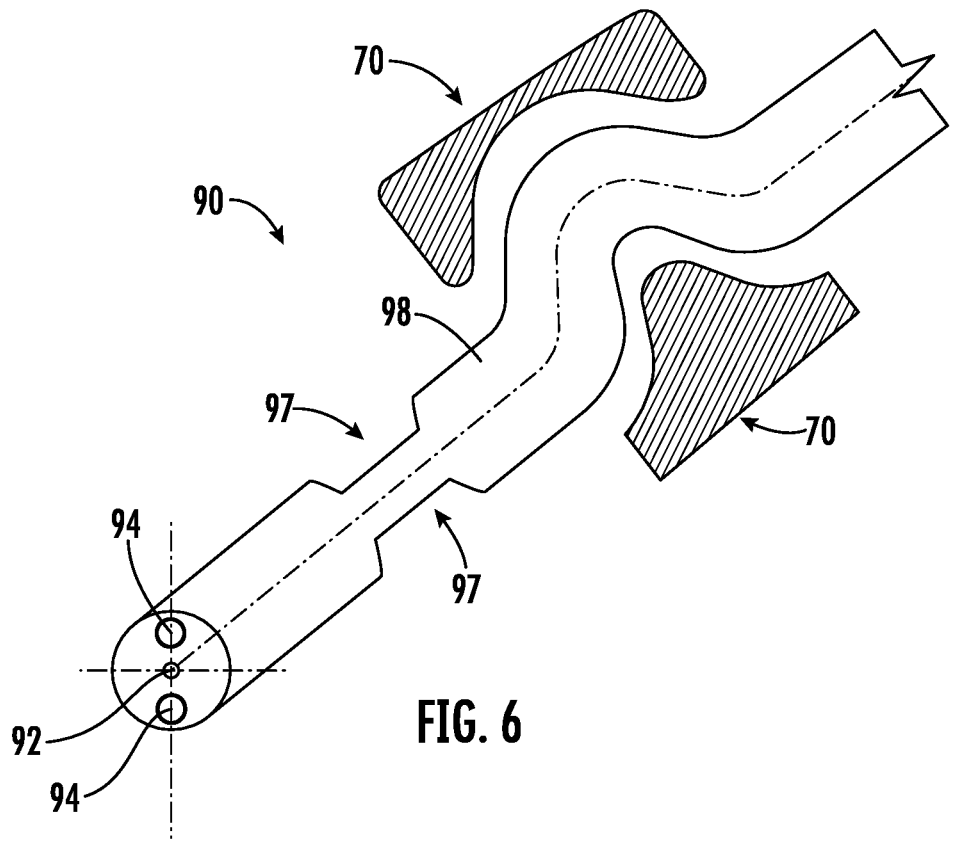
FIG. 6 illustrates a punched area formed with a round fiber optic cable according to one or more embodiments described and illustrated herein.

FIG. 6 illustrates a punched area 97 after portions of the jacket 98 are removed by the punching blades PB shown in FIG. 4. The punched area 97 has two surfaces that are substantially parallel to one another. The punched area 97 will become the flat portion 95 illustrated by FIG. 1A after further cable processing. Namely, the jacket 98 forward of the punched area 97 is stripped and removed.

Figure 7:
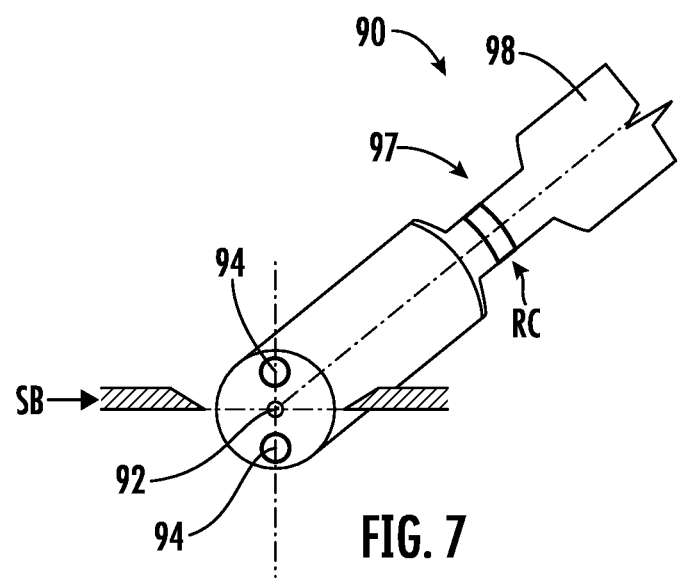
FIG. 7 illustrates a ring cut and splitting of a round fiber optic cable forward of the punched area according to one or more embodiments described and illustrated herein.

Referring now to FIG. 7, an example process for removing the jacket 98 forward of the punched area 97 is illustrated. First, a ring cut RC is formed by a cutting tool at an edge of the punched area 97. The ring cut RC penetrates the remaining jacket 98 in the punched area 97 without affecting the two strength members 94 and the optical fiber 92. Next, the jacket 98 forward of the punched area 97 is split, such as by splitting blades SB. The splitting blades open up the jacket 98 from the front of the fiber optic cable 90 to allow the jacket 98 to be fully removed up to the ring cut RC position.

Figure 8:
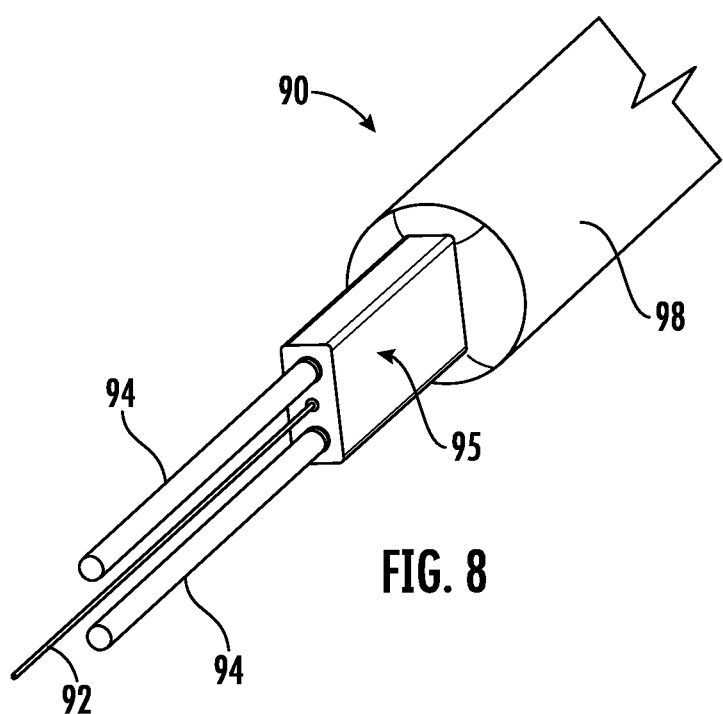
FIG. 8 illustrates a prepared round fiber optic cable having a flat portion according to one or more embodiments described and illustrated herein.

FIG. 8 illustrates a prepared fiber optic cable 90 having a flat portion 95 that is ready to receive a retention body that accepts a flat fiber optic cable despite that the prepared fiber optic cable 90 is a round fiber optic cable. The strength members 94 and the optical fiber 92 protrude past the flat portion 95 and are ready to be inserted into a retention body, such as the retention body 59 illustrated in FIG. 1B.

FIGS. 9-20 illustrate components of a non-limiting example connector that may be positioned on the end of the prepared fiber optic cable 90 shown in FIG. 8. However, it should be understood that other connectors and variations on the example connector shown by FIGS. 9-20 may be used.

The connector 10 generally comprises a housing 20 having a front end 23, a conversion housing 80, and a ferrule 30 disposed in the front end 23 of the housing 20. The connector 10 may also include one or more O-rings 65 that provide environmental sealing. The conversion housing 80 is provided to change the connector 10 from a first connector footprint to a second connector footprint. It should be understood that the conversion housing 80 may or may not be utilized depending on the application.

Figure 9:
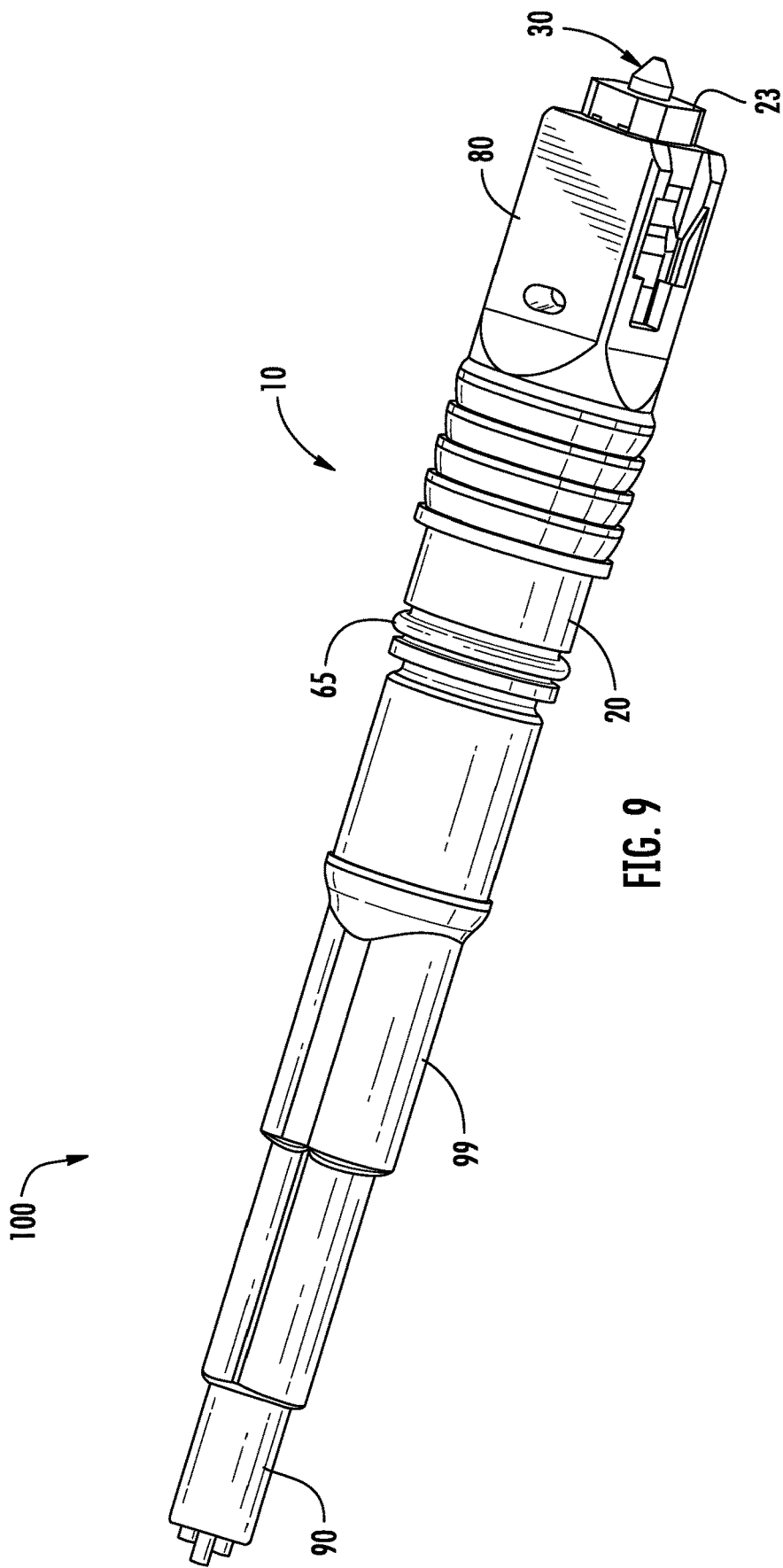
FIG. 9 illustrates a perspective view of an example optical cable assembly having connector attached to a prepared round fiber optic cable, the connector having a ferrule disposed within a ferrule holder that is loaded from the front end of the connector and having a SC housing attached according to one or more embodiments described and illustrated herein.
Figure 10:
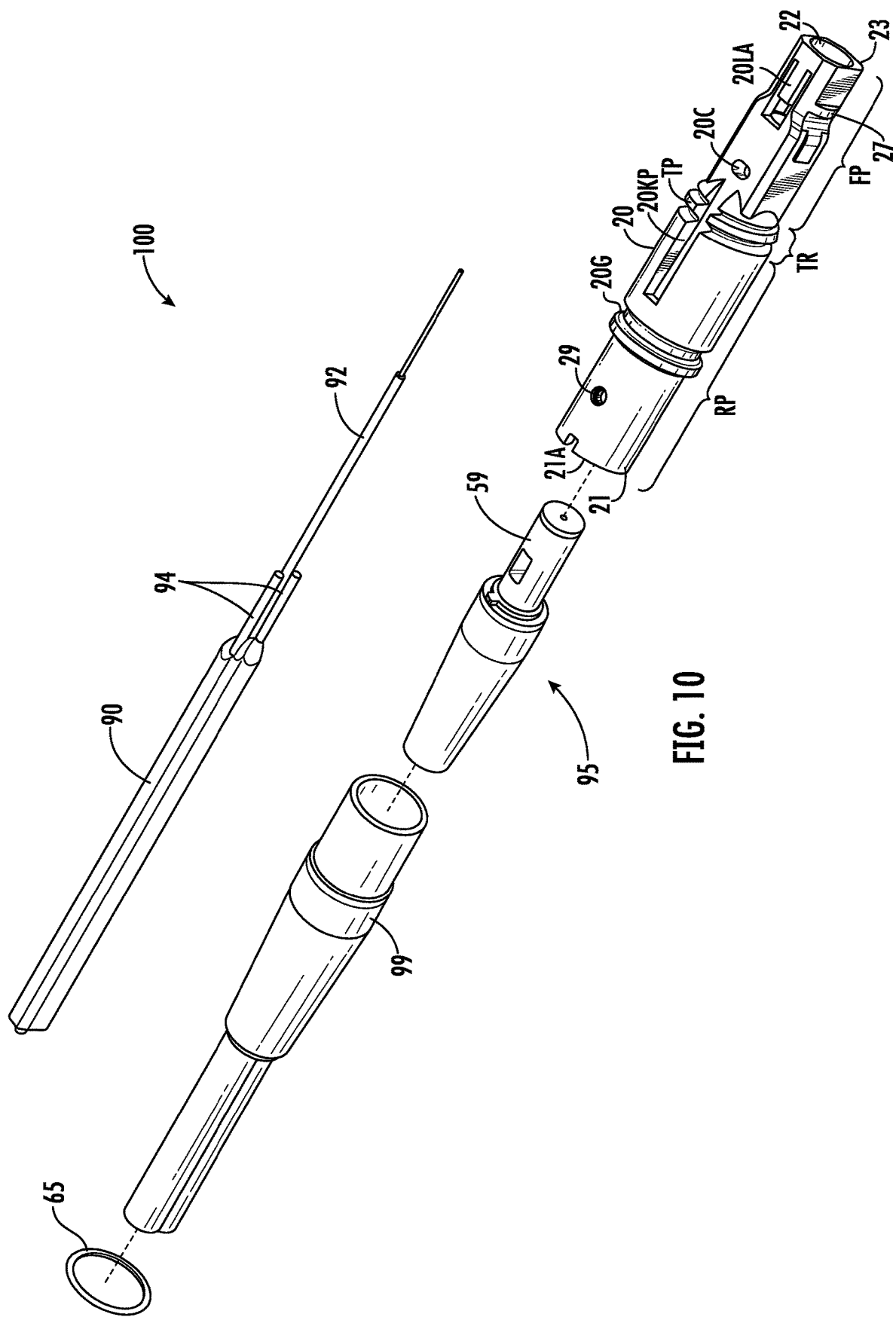
FIG. 10 illustrates an exploded perspective of the optical cable assembly of FIG. 9 according to one or more embodiments described and illustrated herein.

FIG. 10 illustrates an exploded view of the connector 10 illustrated by FIG. 9. In this embodiment, the ferrule 30 is disposed within a ferrule holder 49 and inserted from a front end 23 of the connector 10. This embodiment also comprises a boot or overmold 96 disposed on the rear portion of retention body 59 (also referred to as a cable adapter). Further, when assembled a sealing element such a heat shrink 99 is disposed over the boot or overmold 96 as best shown in FIG. 1B. The sealing element may also be disposed over a portion of the housing 20 as shown. Placing the sealing element over boot or overmold 96 and a portion of the housing 20 allows for sealing of the cable jacket 98 to the rear of the connector. This may also improve the bending strain-relief for the cable assembly.

Figure 13:
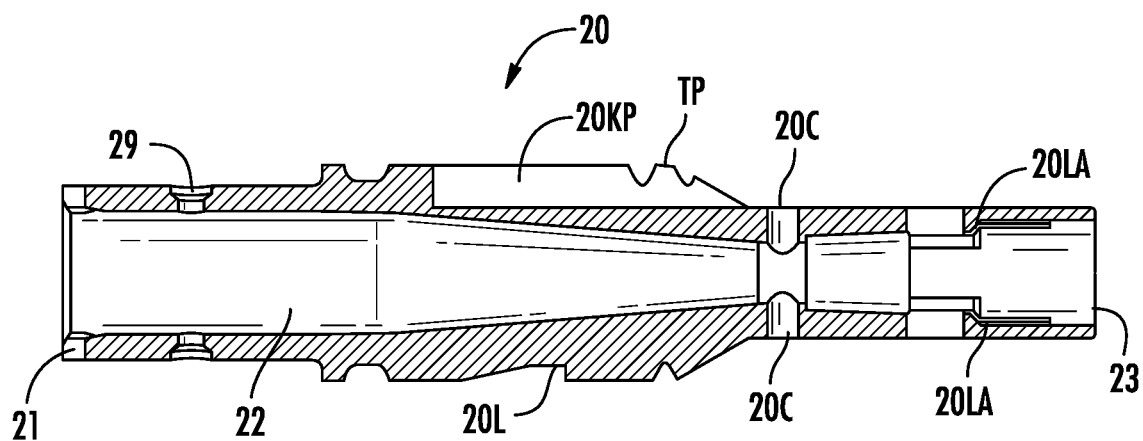
FIGS. 13 and 14 are cross-sectional views of the housing of the connector of FIGS. 9-11 according to one or more embodiments described and illustrated herein.
Figure 14:
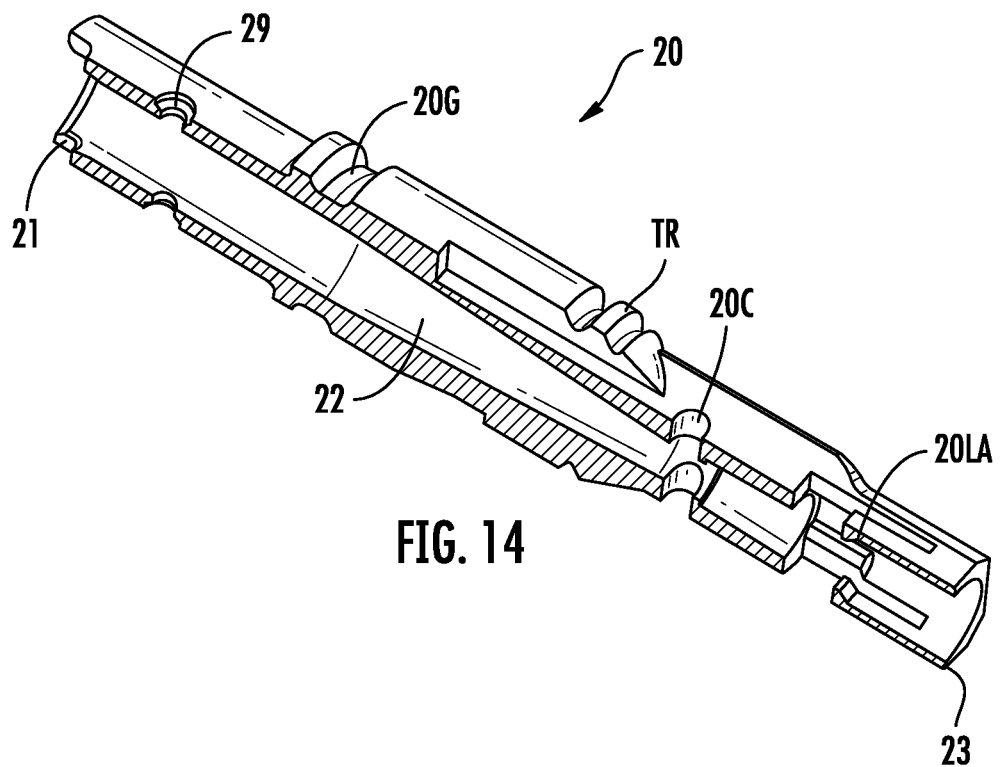
Figure 15:
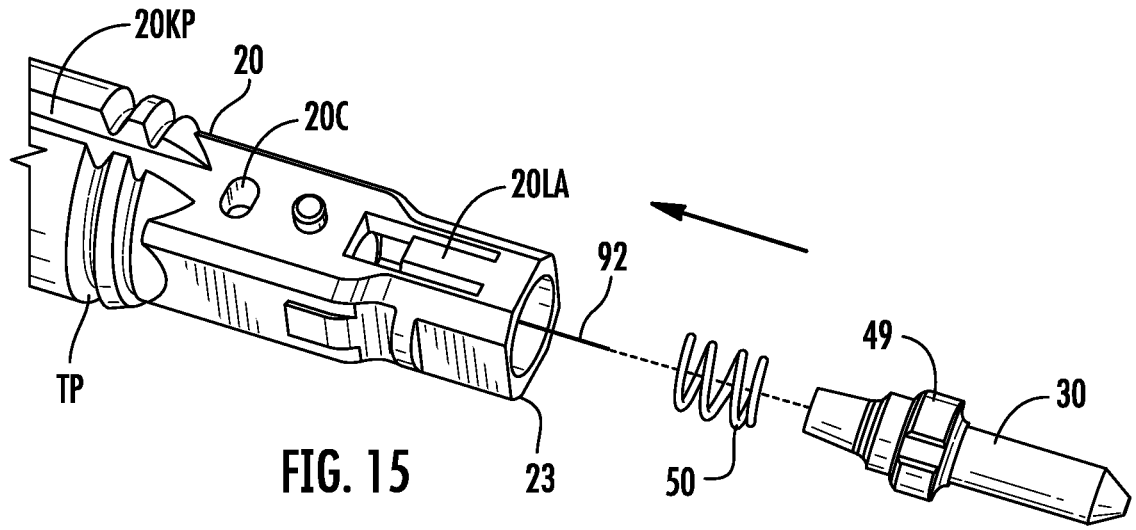
FIG. 15 is a partially exploded view of the front end of the connector depicted in FIGS. 9-11 according to one or more embodiments described and illustrated herein.

Connector 10 of FIGS. 9-20 has a ferrule 30 disposed within a ferrule holder 49 and inserted from a front end 23 of the connector 10 as depicted in FIG. 15. The housing 20 of the connector 10 of FIGS. 9-18 is similar to other housings 20 discussed herein and differences with be described while other details will not be repeated for the sake of brevity.

Figure 11:
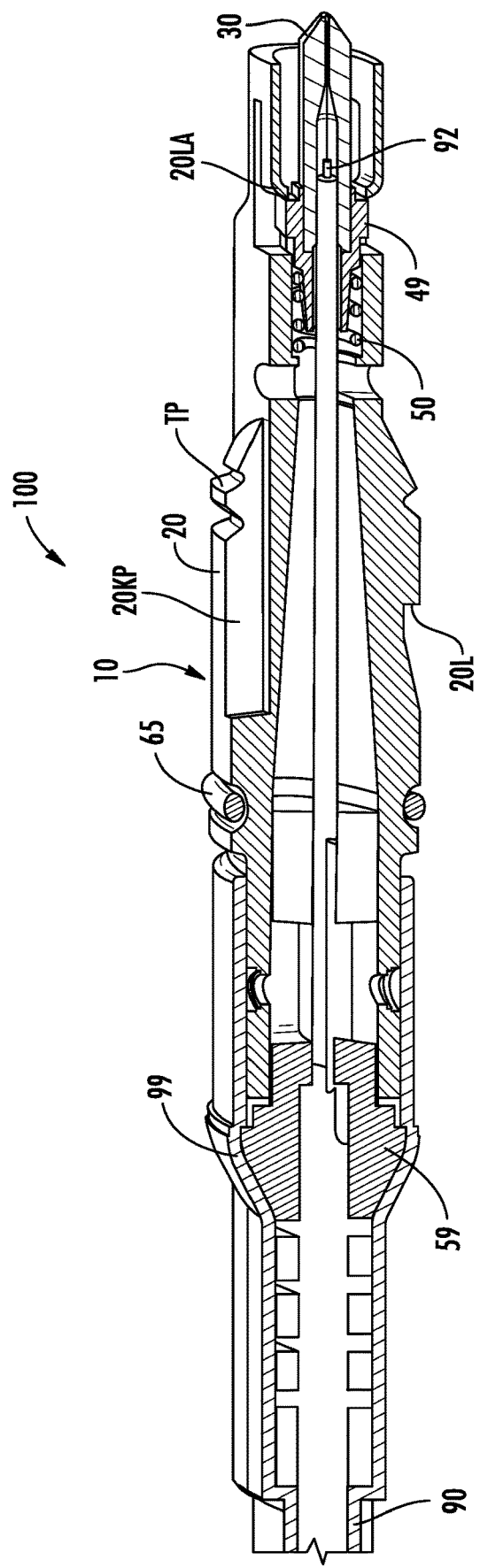
FIG. 11 illustrates a cross-section view of the optical cable assembly of FIG. 9 according to one or more embodiments described and illustrated herein.
Figure 18:
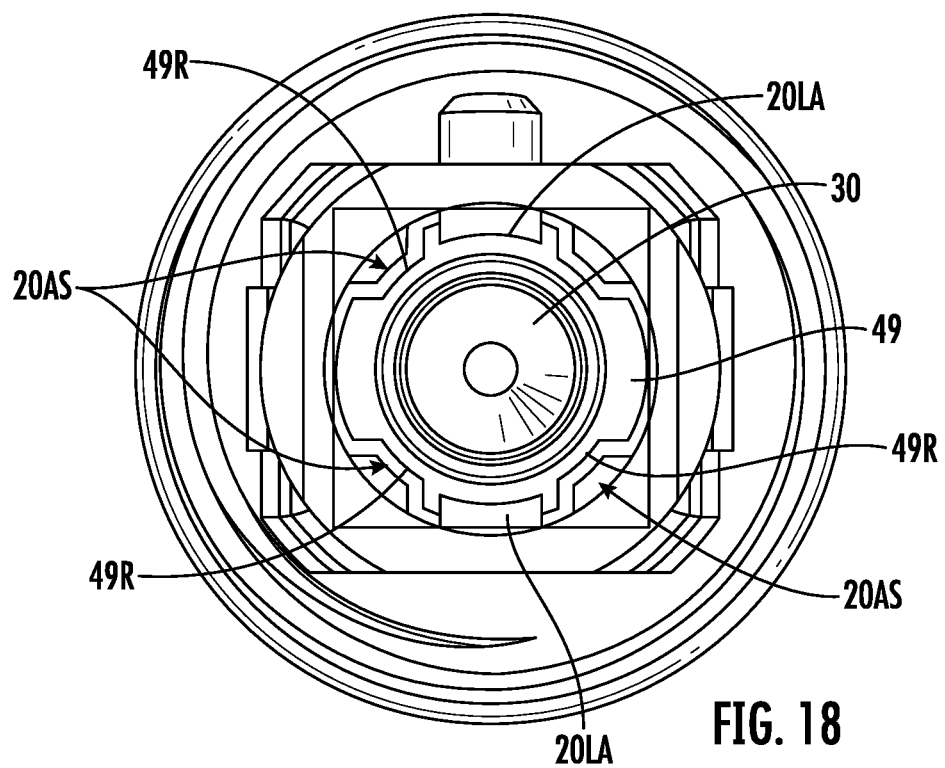
FIG. 18 is a front end view of the connector depicted in FIGS. 9-11 without the SC housing showing the details for the retention of the ferrule holder assembly according to one or more embodiments described and illustrated herein.

FIGS. 9 and 11 respectively are perspective and sectional views showing a cable assembly 100 comprising a connector 10 having a ferrule 30 disposed within a ferrule holder 49, thereby forming a ferrule sub-assembly (not numbered) that is biased to a forward position by resilient member 50. When assembled, ferrule sub-assembly 60 is configured to cooperate with the housing 20 for inhibiting the rotation of the ferrule sub-assembly 60 with respect to the housing 20 as best shown in FIG. 18.

As depicted in FIG. 9, the connector 10 is configured so that the conversion housing 80 may be attached to the housing 20 for converting to an SC connector. Likewise, the connector 10 has a housing 20 with a transition region TR with a threaded portion TP so it may be converted to a hardened connector.

Figure 12:
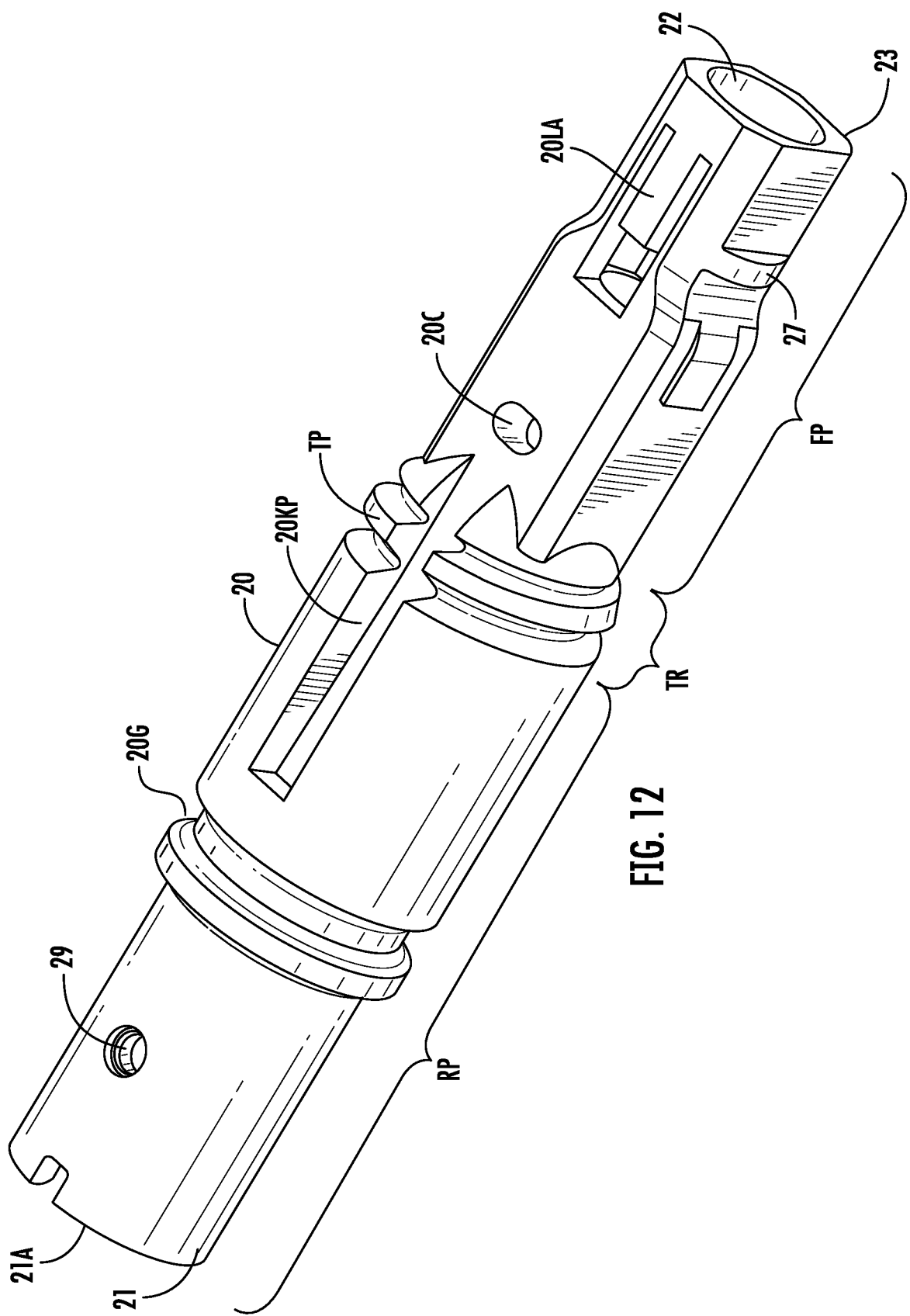
FIG. 12 is a perspective view of the connector housing of FIGS. 9-11 according to one or more embodiments described and illustrated herein.

FIGS. 12-14 are various views of the housing 20 of the connector 10 depicted in FIGS. 9-11. The housing 20 further comprises one or more latch arms 20LA disposed in a front portion FP of housing 20 as depicted. Moreover, the front opening of the passageway 22 is sized for allowing the insertion of ferrule holder 49 from the front end 23 of the housing 20 such as shown in the cross-section of FIG. 13. The latch arms 20LA are connected at the front end and cantilevered at the rear end so they can be deflected when ferrule holder 49 is inserted and then spring back to retain the ferrule holder 49 once it is fully-inserted.

Figure 16:
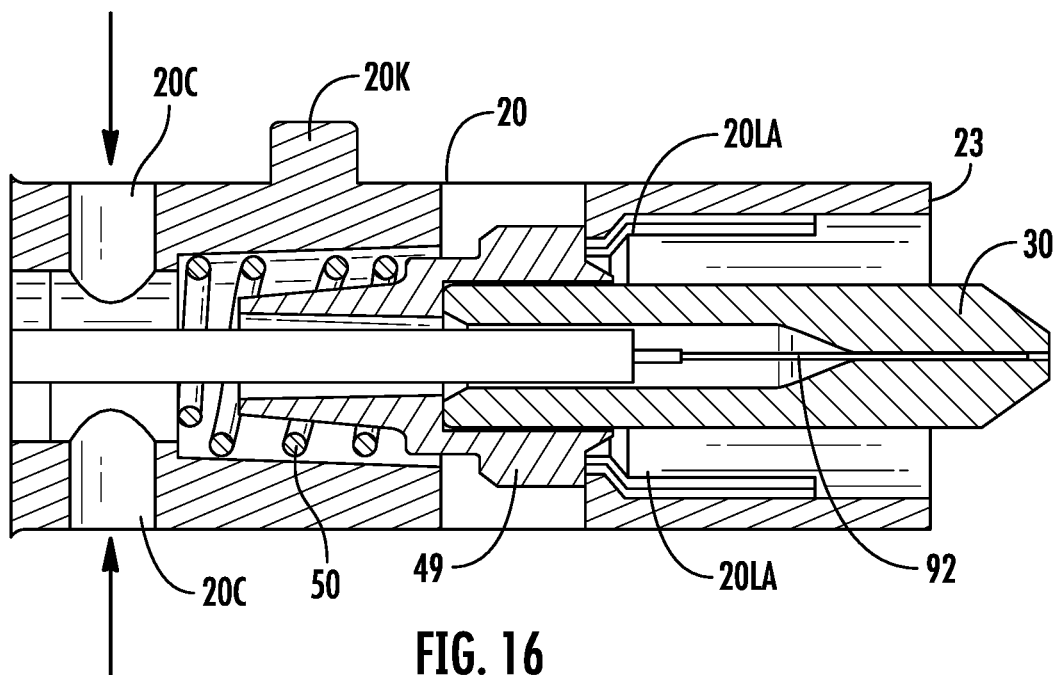
FIG. 16 is a cross-sectional view of the front end of the connector depicted in FIGS. 9-11 according to one or more embodiments described and illustrated herein.

FIG. 15 is a partially exploded view of the front end of the connector 10 prior to the ferrule holder 49 and the ferrule 30 being inserted into the housing 20. FIG. 16 is a cross-sectional view of the front end of the connector 10 after the ferrule holder 49 and the ferrule 30 are inserted into the housing 20 and retained by the latch arms 20LA. As depicted, the latch arms 20LA have ramp portions for aiding portions of ferrule holder 49 to deflect the latch arms 20LA outward as the ferrule holder 49 is inserted into the housing 20 and then spring back over the ferrule holder 49 for retaining the same.

Referring to FIG. 15, the optical fiber 92 of the fiber optic cable 90 is assembled to extend past the front end 23 and the resilient member 50 is threaded about the optical fiber 92 and then the ferrule holder 49 and ferrule 30 are threaded over the optical fiber 92. The optical fiber 92 may be clamped in a suitable manner through the bores 20C disposed on opposite side of housing 20 as represented by the arrows in FIG. 16 when the ferrule holder 49 is being inserted into the housing 20. Clamping the optical fiber 92 inhibits the optical fiber 92 from pushing rearward or buckling as the ferrule holder 49 inserted. The ferrule holder 49 is aligned to a suitable rotational position and pushed rearward into housing 20 until retained by the latch arms 20LA as depicted in FIG. 16. The optical fiber 92 is secured to the ferrule 30 in a suitable fashion and the end face of ferrule 30 is polished.

Figure 17:
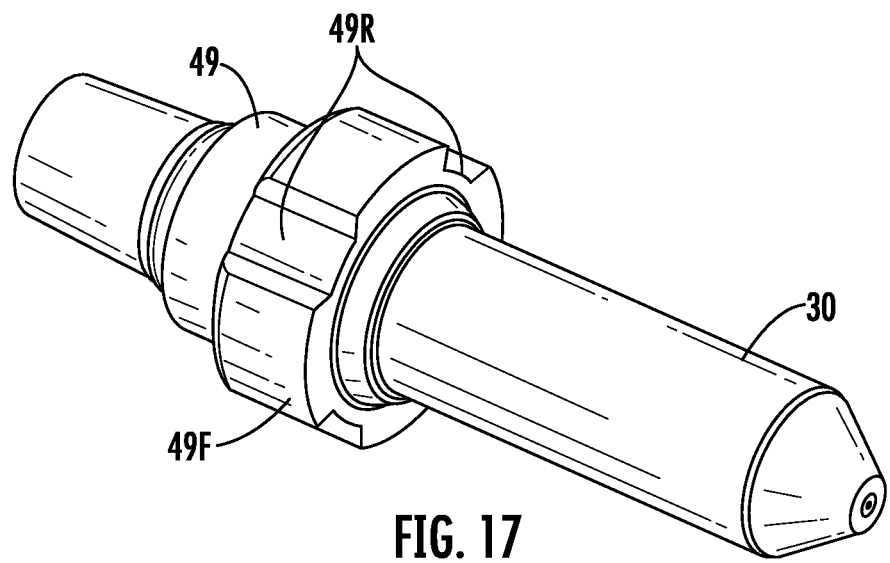
FIG. 17 is a perspective view of the ferrule and ferrule holder of the connector depicted in FIGS. 9-11 according to one or more embodiments described and illustrated herein.

Additionally, the ferrule holder 49 may be configured for tuning the ferrule 30 relative to the housing 20. FIG. 17 is a perspective detailed view of the ferrule 30 disposed in the ferrule holder 49. As shown, the ferrule holder 49 comprises a plurality of recesses 49R formed in flange 49F for tuning of the connector. In this embodiment, the flange 49F has four recesses 49R allowing four different rotational positions for the ferrule holder 49/ferrule 30, thereby allowing quadrant tuning. FIG. 18 is a detailed front end view of the connector 10 showing that the front opening of the housing 20 is sized for allowing the insertion of the ferrule holders. Additionally, a portion of the passageway 22 is sized to cooperate with the flange 49F and allow different rotational positions. Consequently, after measurement of the end face profile of the ferrule 30 or measurement of the insertion loss, the ferrule 30 may be tuned if desired for improving performance such as to a Grade B standard. By way of explanation, the latch arms 20LA may be deflected outward to release the ferrule holder 49 and then the ferrule holder 49 is rotated to the desired position and inserted back into the housing 20 until it is retained by the latch arms 20LA. Other embodiments of the ferrule holder 49 may have other suitable numbers of rotational positions as desired.

Figure 19:
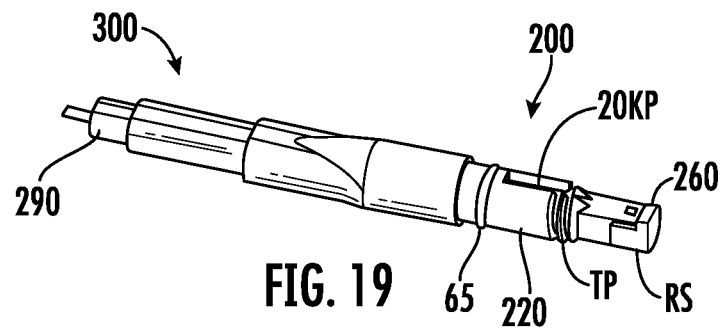
FIG. 19 is an assembled perspective view of an example fiber optic cable assembly comprising a multifiber optic connector comprising a housing with a transition region with a threaded portion according to one or more embodiments described and illustrated herein.

The concepts of the housings for connectors disclosed herein may also be used with multifiber connectors. By way of example, FIG. 19 is an assembled perspective view of a cable assembly 300 comprising a multifiber optic connector 200 having a housing 220. The housing 220 is similar to housing 20 disclosed herein comprising a rear end (221) and a front end (223) with a longitudinal passageway (222) extending from the rear end (221) to the front end (223). The housing 220 comprises a part of the rear portion (RP) having a round cross-section (RCS) and a part of the front portion (FP) having a non-round cross-section (MRCS). By way of explanation, the front portion (FP) may have a rectangular cross-section with rounded sides (RS) that provides a first orientation feature for the connector for alignment during mating and inhibit insertion into a non-compliant device or port.

Figure 20:
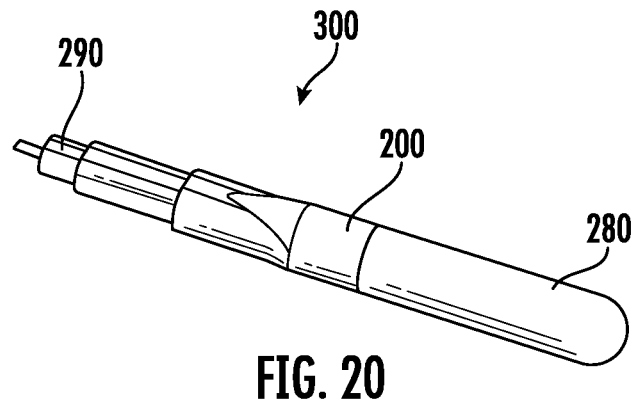
FIG. 20 is a perspective view of the multifiber optic connector of FIG. 19 with a dust cap attached according to one or more embodiments described and illustrated herein.

FIG. 20 depicts multifiber optic connector 200 may use a dust cap 280 attached for protecting a ferrule 230 form dust, debris and the like when not connected. Like other embodiments disclosed herein, dust cap 280 may be configured for attaching to the housing 220 using the threaded portion (TP).

Figure 21:
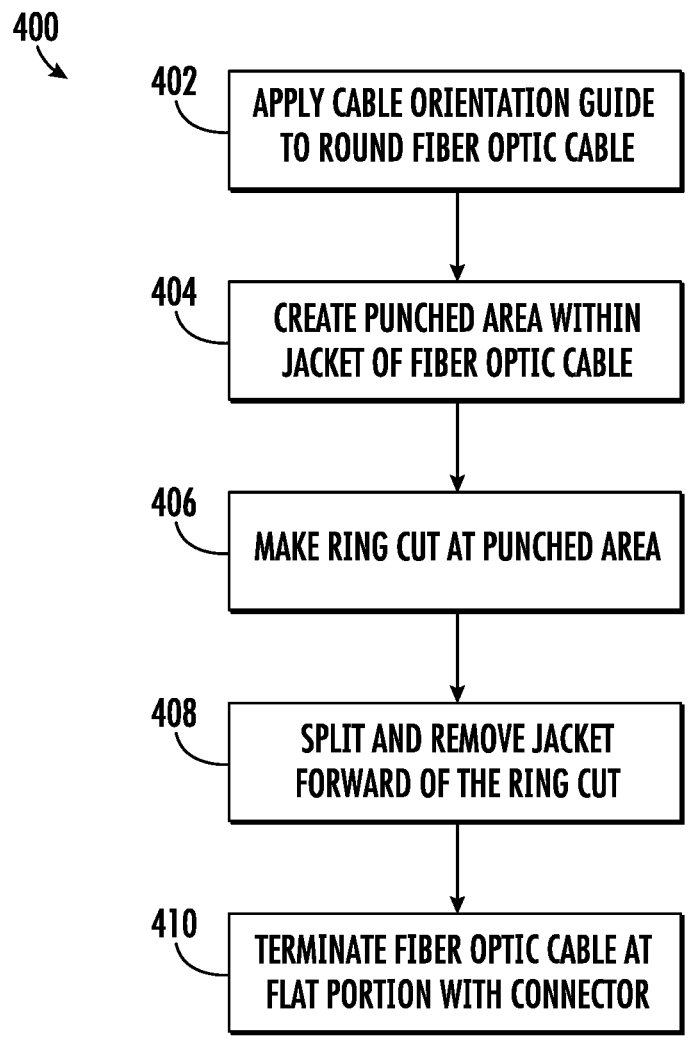
FIG. 21 illustrates a flowchart of an example method for preparing a round fiber optic cable for termination by a flat-type optical connector.

Referring now to FIG. 21, an example method 400 for preparing a round fiber optic cable 90 to be terminated by a connector requiring a flat fiber optic cable is illustrated. At block 402, a cable orientation guide 70 is applied to a round fiber optic cable 90 to curve the round fiber optic cable 90. Turning the round fiber optical cable 90 preferentially rotates the angular position of the round fiber optic cable 90 so that its strength axis SA is orientated along the preferred axis PA that avoids damage to the strength members 94 of the round fiber optic cable 90 during subsequent steps.

At block 404, a punched area 97 is formed within a jacket 98 of the round fiber optic cable 90, for example by using a tool having punching blades. The punched area 97 has two flat sides that will define a flat portion 95 of the round fiber optic cable 90 for connector termination.

At block 406, a ring cut RC is made in a forward portion of the punched area 97 using a tool. The ring cut RC cuts through the jacket 98 material in the punched area 97 while leaving the strength members 94 intact. At block 408, the jacket 98 forward of the ring cut RC is split and removed. Removal of this portion of the jacket 98 exposes the two strength members 94 and the optical fiber 92, as well as defines the flat portion 95 of the prepared fiber optic cable 90.

At block 410, the prepared fiber optic cable 90 is terminated with a connector. For example, a retention body 59 may be secured to the flat portion 95 of the prepared fiber optic cable 90 by inserting the strength members 94 and the optical fiber 92 into the retention body 59. The strength members 94 are then secured to the retention body 59. For example, an adhesive may be used to rigidly secure the strength members 94 to the retention body 59.

It is noted that recitations herein of a component of the embodiments being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the embodiments of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. A method of preparing a round fiber optic cable, the method comprising:
applying a cable orientation guide to a portion of the fiber optic cable, wherein:
the fiber optic cable comprises a jacket, a first strength member, a second strength member, and an optical fiber;
the first strength member, the second strength member and the optical fiber are disposed within the jacket along a strength axis;
clamping of the cable orientation guide curves the portion of the optical fiber, and rotates the fiber optic cable such that the strength axis is positioned along a preferential axis;
forming a punched area in the jacket by removing a first portion of the jacket that is offset from the strength axis in a first direction and removing a second portion of the jacket that is offset from the strength axis in a second direction; and
removing a portion of the jacket forward of the punched area to provide a flat end face defined by the punched area.

2. The method of claim 1, wherein the cable orientation guide comprises a first half having an inner concave portion and a second half having an inner convex portion.

3. The method of claim 1, wherein the cable orientation guide comprises a set of rollers.

4. The method of claim 3, wherein:
the set of rollers comprises a first roller, a second roller, and a third roller; and
the first roller and the third roller are on a first side of the fiber optic cable and the second roller is on a second side of the fiber optic cable that is opposite from the first side.

5. The method of claim 1, wherein forming the punched area is performed by use of two punching blades.

6. The method of claim 1, wherein removing the portion of the jacket forward of the punched area comprise forming a ring cut in the punched area and splitting the jacket along a longitudinal length of the fiber optic cable forward of the ring cut.

7. The method of claim 1, wherein removing the portion of the jacket forward of the punched area forms a flat cable portion.

8. The method of claim 1, wherein the fiber optic cable has a preferential bend axis that is substantially orthogonal to the preferential axis.

9. The method of claim 1, wherein a force to bend the fiber optic cable is greatest when bending the fiber optic cable in a direction along the preferential axis.

10. A prepared fiber optic cable fabricated by the method of claim 1.

11. A method of assembling a fiber optic cable assembly, the method comprising:
applying a cable orientation guide to a portion of the fiber optic cable, wherein:

the fiber optic cable comprises a jacket, a first strength member, a second strength member, and an optical fiber;

the first strength member, the second strength member and the optical fiber are disposed within the jacket along a strength axis; and clamping of the cable orientation guide curves the portion of the optical fiber, and rotates the fiber optic cable such that the strength axis is positioned along a preferential axis;

forming a punched area in the jacket by removing a first portion of the jacket that is offset from the strength axis in a first direction and removing a second portion of the jacket that is offset from the strength axis in a second direction;

removing a portion of the jacket forward of the punched area to provide a flat end face defined by the punched area to expose a length of the first strength member, the second strength member, and the optical fiber;

inserting the first strength member, the second strength member and the optical fiber into a retention body; and securing the first strength member and the second strength member to the retention body.

12. The method of claim 11, wherein the cable orientation guide comprises a first half having an inner concave portion and a second half having an inner convex portion.

13. The method of claim 11, wherein the cable orientation guide comprises a set of rollers.

14. The method of claim 13, wherein:

the set of rollers comprises a first roller, a second roller, and a third roller; and the first roller and the third roller are on a first side of the fiber optic cable and the second roller is on a second side of the fiber optic cable that is opposite from the first side.

15. The method of claim 11, wherein forming the punched area is performed by use of two punching blades.

16. The method of claim 11, wherein removing the portion of the jacket forward of the punched area comprise forming a ring cut in the punched area and splitting the jacket along a longitudinal length of the fiber optic cable forward of the ring cut.

17. The method of claim 11, wherein removing the portion of the jacket forward of the punched area forms a flat cable portion.

18. The method of claim 11, wherein the fiber optic cable has a preferential bend axis that is substantially orthogonal to the preferential axis.

19. The method of claim 11, wherein a force to bend the fiber optic cable is greatest when bending the fiber optic cable in a direction along the preferential axis.

20. The method of claim 11, wherein:

the retention body comprises an opening; and the securing of the first strength member and the second strength member to the retention body comprises disposing adhesive within the opening.

21. The method of claim 11, further comprising:

prior to inserting the first strength member, the second strength member and the optical fiber into the retention body, inserting the first strength member, the second strength member and the optical fiber into a boot; and securing the boot to the retention body.

22. The method of claim 17, further comprising applying a heat shrink to the boot and the retention body.

23. The method of claim 17, further comprising attaching a connector body to the retention body.

24. An fiber optic cable assembly fabricated by the method of claim 11.

\* \* \* \* \*